Aug. 3, 1926.
J. W. SMITH
1,594,476
ANTIFRICTION SPRING CONNECTION
Filed March 11, 1925
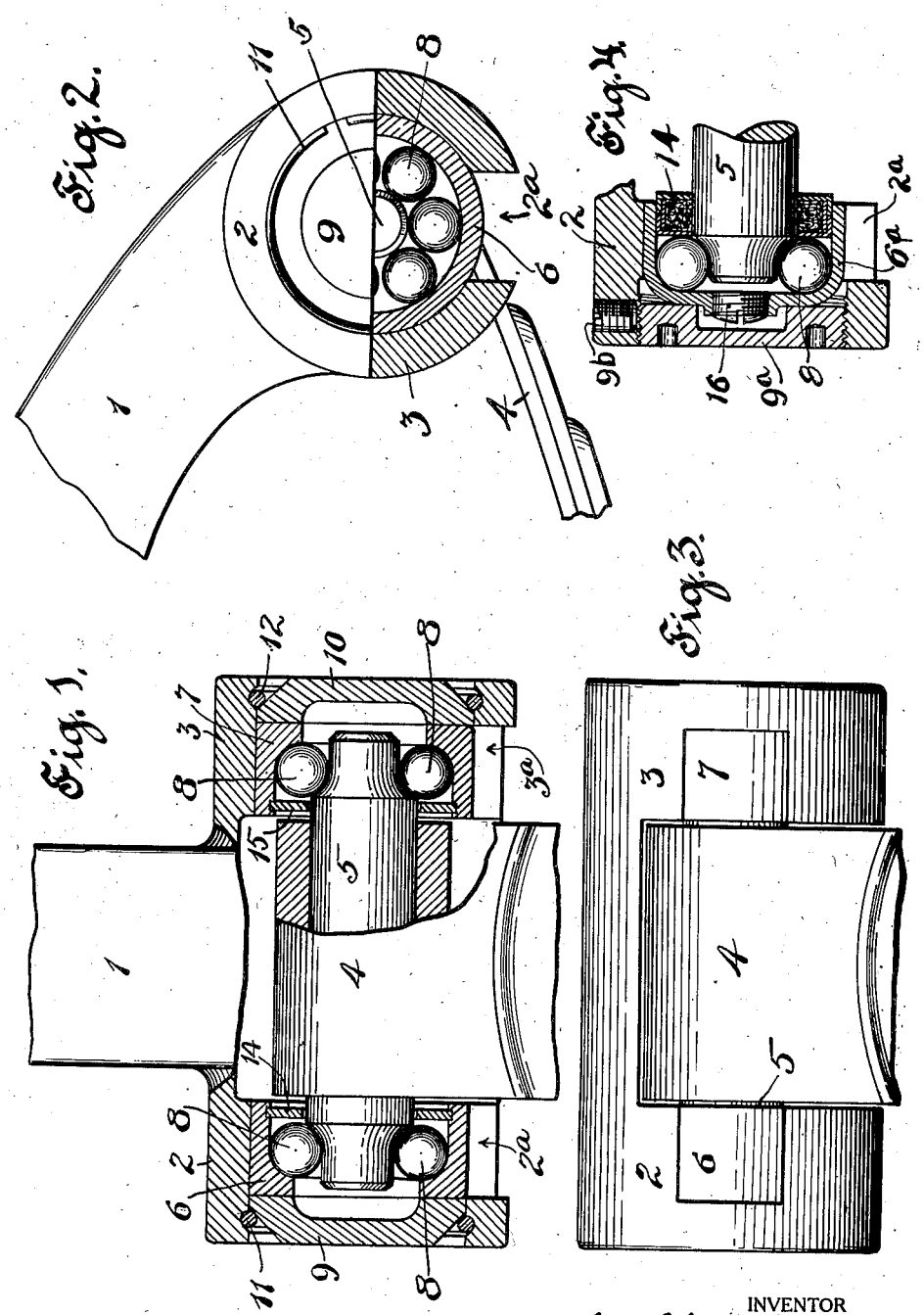
INVENTOR
John W. Smith
BY
Mitchell & Bechert
ATTORNEYS Patented Aug. 3, 1926.

1,594,476

UNITED STATES PATENT OFFICE.

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

ANTIFRICTION SPRING CONNECTION.

Application filed March 11, 1925. Serial No. 14,653.

My invention relates to what I will term a hinge joint for vehicle springs, the object being to provide a simple and efficient construction that will lend itself to the use of anti-friction devices, whereby the oscillation of the springs and the working of the joint will be noiseless, free and easy, and will require lubrication on only rare occasions. Another object of the present invention is to provide a construction that will facilitate the ready assembly and disassembly of the various parts.

In the drawings which show for illustrative purposes only preferred forms of the invention:

Fig. 1 is a front elevation of a spring end and the associated parts of the hinge bearing therefor, certain parts being shown in section;

Fig. 2 is a side elevation, partly in section;

Fig. 3 is a view of the underside of the parts shown in Fig. 1;

Fig. 4 is a fragmentary sectional view of a modification.

1 represents what is sometimes termed a "horn", usually provided at the front and rear end of a vehicle frame. It may be assumed, in this instance, that the horn 1 is the front end of one of the sills of the vehicle frame. 2—3 represent integral, lateral hub-like extensions on the end of the horn 1. 4 represents the front end of a vehicle spring, in the eye of which is shrunk or otherwise rigidly fixed a bearing pin 5. The ends of the pin 5 project beyond the edges of the spring, so that they may coact with anti-friction devices. 6—7 are annular bearing tracks for receiving anti-friction devices, such as balls 8—8. 9—10 are caps adapted to the ends of the hubs 2—3 and which serve to hold the parts 6—7 respectively in place. 11—12 are split rings, which serve to hold the caps 9—10 respectively in place. 14—15 conventionally represent dust protecting washers of any suitable construction, provided to prevent dirt from entering the bearing chambers at the ends of the pin 5.

$2^a$—$3^a$ are passages or recesses in the lower side of the hubs 2—3, respectively, said recesses being of a size sufficient to permit the ends of the pin 5 to pass therethrough, so that when the pieces 6—7 are removed by withdrawing them from the hubs 2—3, the spring may be disconnected from the horn by simply moving the spring end 4 in a direction to cause the pin ends 5 to pass out through the passages $2^a$—$3^a$. Were it not for these clearance passages it would, of course, be necessary to drive the pin 5 out of the eye in the end of the spring 4 before the spring could be removed from the horn. By the present construction this act of driving the pin out is avoided and the act of assembling or disassembling is greatly facilitated.

In Fig. 4 I have shown a modification, in which the cap for holding the bearing piece $6^a$ in place is indicated at $9^a$, the same being threaded into the hub 2, so that, by turning said cap, it may be advanced and retracted, and thus the bearing ring $6^a$ may be adjusted on the balls 8 to take up wear. $9^b$ is a set screw, to hold the cap $9^a$ in place after adjustment has been effected. In the form shown in Fig. 4 the race ring $6^a$ is a sheet metal cup in which the dust ring 14 is fitted. The bottom of the cup may be apertured and threaded so as to permit a tool to be inserted for withdrawing the cup $6^a$ from the boss 2. If desired the aperture may be closed as by means of a screw plug 16 which, however, is readily removable to permit the bearing surfaces to be lubricated or to permit the use of the tool as above described.

I claim:

1. In an anti-friction bearing for a vehicle and in combination with a frame and spring, bosses on said frame and spaced apart to admit the end of the spring, a bearing pin secured in the spring end and having ends projecting laterally beyond the sides thereof, said bosses having recesses therein to receive said pin ends, one of said bosses having a lateral passage entering the recess therein to permit the introduction of the pin ends into said recesses, and anti-friction members for supporting said pin ends in said recesses.

2. In the combination defined in claim 1, said other boss having a lateral passage therein communicating with its recess for permitting the passage of a pin end.

3. In an anti-friction bearing for a vehicle and in combination with a vehicle frame and spring, bosses on said frame and having recesses therein, a bearing pin secured to said spring and having ends projecting laterally beyond the sides thereof to be received in said recesses, a removable closure for one end of one of said recesses, anti-friction bearing members between said pin end and parts of said recesses for supporting said pin ends therein, said bosses having lateral passages communicating with said recesses to permit the introduction of said pin ends into said recesses.

4. As an article of manufacture, a vehicle frame having aligned bearing recesses therein spaced apart from each other, said frame having a lateral passage therein communicating with one of said recesses.

5. In an anti-friction bearing for a vehicle and in combination with a frame and spring, said frame having spaced apart bearing recesses therein, said spring having anti-friction bearing member raceways thereon projecting laterally beyond the sides thereof, said frame having a lateral passage communicating with at least one of said bearing recesses for permitting the introduction of said anti-friction bearing member raceways carried by said spring into said recesses, and anti-friction bearing members between said raceways and said bearing recesses.

6. In the combination defined in claim 5, and complementary bearing member race rings in said bearing recesses to engage said anti-friction bearing members.

7. In the combination defined in claim 5, and removable closure members for the outer ends of said recesses in said frame.

JOHN W. SMITH.